United States Patent
Lillibridge et al.

(10) Patent No.: US 9,141,621 B2
(45) Date of Patent: Sep. 22, 2015

(54) COPYING A DIFFERENTIAL DATA STORE INTO TEMPORARY STORAGE MEDIA IN RESPONSE TO A REQUEST

(75) Inventors: Mark David Lillibridge, Mountain View, CA (US); Kave Eshghi, Los Altos, CA (US); Deepavali Mahendra Bhagwat, Mountain View, CA (US); Vinay Deolalikar, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1467 days.

(21) Appl. No.: 12/432,807

(22) Filed: Apr. 30, 2009

(65) Prior Publication Data

US 2010/0280997 A1    Nov. 4, 2010

(51) Int. Cl.
  G06F 7/00     (2006.01)
  G06F 17/30    (2006.01)
  G06F 3/06     (2006.01)

(52) U.S. Cl.
  CPC .......... *G06F 17/30067* (2013.01); *G06F 3/064* (2013.01); *G06F 17/30156* (2013.01); *G06F 17/30194* (2013.01)

(58) Field of Classification Search
  USPC ......... 707/652, 681, 736, 748, 749, 756, 770, 707/792, E17.001, E17.002, E17.032, 966, 707/999.1, 999.101, 999.2
  See application file for complete search history.

(56) References Cited

U.S. PATENT DOCUMENTS

| | | | |
|---|---|---|---|
| 5,408,653 A | 4/1995 | Josten | |
| 5,574,902 A | 11/1996 | Josten | |
| 5,638,509 A | 6/1997 | Dunphy | |
| 5,990,810 A | 11/1999 | Williams | |

(Continued)

FOREIGN PATENT DOCUMENTS

| | | |
|---|---|---|
| WO | WO-02/37689 A1 | 5/2002 |
| WO | 2006030326 A1 | 3/2006 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002 (8 pages).

(Continued)

*Primary Examiner* — Uyen Le
(74) *Attorney, Agent, or Firm* — Trop, Pruner & Hu, P.C.

(57) ABSTRACT

A plurality of differential data stores are stored in persistent storage media. In response to receiving a first request to store a particular data object, one of the differential data stores that are stored in the persistent storage media is selected, wherein selecting the one differential data store is according to a criterion relating to compression of data objects in the differential data stores. The selected differential data store is copied into temporary storage media, where the copying is not delayed after receiving the first request to await receipt of more requests. The particular data object is inserted into the copy of the selected differential data store in the temporary storage media, where the inserting is performed without having to retrieve more data from the selected differential store in the persistent storage media. The selected differential data store in the persistent storage media is replaced with the copy of the selected differential data store in the temporary storage media that has been modified.

20 Claims, 3 Drawing Sheets

(56) References Cited

U.S. PATENT DOCUMENTS

| | | | |
|---|---|---|---|
| 6,141,053 A | 10/2000 | Saukkonen | |
| 6,513,050 B1 | 1/2003 | Williams | |
| 6,651,140 B1* | 11/2003 | Kumar | 711/118 |
| 6,839,680 B1 | 1/2005 | Liu | |
| 6,938,005 B2 | 8/2005 | Iverson | |
| 6,961,009 B2 | 11/2005 | McCanne | |
| 7,082,548 B2 | 7/2006 | Nakano | |
| 7,085,883 B1 | 8/2006 | Dalgic | |
| 7,185,163 B1* | 2/2007 | Knight et al. | 711/165 |
| 7,269,689 B2 | 9/2007 | Eshghi | |
| 7,493,313 B2* | 2/2009 | Kakivaya et al. | 1/1 |
| 7,536,291 B1 | 5/2009 | Vijayan Retnamma | |
| 7,558,801 B2 | 7/2009 | Getzinger | |
| 8,190,742 B2 | 5/2012 | Fineberg | |
| 8,543,782 B2 | 9/2013 | Fineberg | |
| 2001/0010070 A1 | 7/2001 | Crockett | |
| 2002/0103975 A1 | 8/2002 | Dawkins | |
| 2002/0156912 A1 | 10/2002 | Hurst | |
| 2003/0101449 A1 | 5/2003 | Bentolila | |
| 2003/0110263 A1 | 6/2003 | Shillo | |
| 2003/0140051 A1 | 7/2003 | Fujiwara | |
| 2003/0223638 A1 | 12/2003 | Jackson | |
| 2004/0054700 A1 | 3/2004 | Okada | |
| 2004/0162953 A1 | 8/2004 | Yoshida | |
| 2004/0230559 A1 | 11/2004 | Newman | |
| 2005/0091234 A1 | 4/2005 | Hsu | |
| 2006/0059173 A1 | 3/2006 | Hirsch | |
| 2006/0059207 A1 | 3/2006 | Hirsch | |
| 2006/0155735 A1 | 7/2006 | Traut | |
| 2006/0293859 A1 | 12/2006 | Pipke | |
| 2007/0100913 A1 | 5/2007 | Summer et al. | |
| 2007/0220197 A1 | 9/2007 | Lasser | |
| 2007/0250519 A1* | 10/2007 | Fineberg et al. | 707/100 |
| 2007/0250670 A1 | 10/2007 | Fineberg | |
| 2007/0250674 A1* | 10/2007 | Fineberg et al. | 711/162 |
| 2008/0126176 A1 | 5/2008 | Iguchi | |
| 2009/0019227 A1 | 1/2009 | Koski | |
| 2009/0112945 A1 | 4/2009 | Camble | |
| 2009/0112946 A1 | 4/2009 | Jones | |
| 2009/0113167 A1 | 4/2009 | Camble | |
| 2010/0161554 A1 | 6/2010 | Datuashvili | |
| 2010/0198792 A1 | 8/2010 | Camble | |
| 2010/0198832 A1 | 8/2010 | Jones | |
| 2010/0205163 A1 | 8/2010 | Eshghi | |
| 2010/0235372 A1 | 9/2010 | Camble | |
| 2010/0235485 A1 | 9/2010 | Lillibridge | |
| 2010/0246709 A1 | 9/2010 | Lillibridge | |
| 2010/0268876 A1* | 10/2010 | Reid et al. | 711/114 |
| 2010/0281077 A1 | 11/2010 | Lillibridge | |

FOREIGN PATENT DOCUMENTS

| | | |
|---|---|---|
| WO | 2006094365 A1 | 9/2006 |
| WO | 2006094366 A1 | 9/2006 |
| WO | 2006094367 A1 | 9/2006 |
| WO | 2007127248 A2 | 11/2007 |
| WO | 2009054828 A1 | 4/2009 |
| WO | 2009131585 A1 | 10/2009 |

OTHER PUBLICATIONS

Baoyao, Zhou; ""Intelligent Web Usage Mining"" Nanyang Technological University, Division of Information Systems, School of Computer Engineering, 2004 (94 pages).

Baynote Inc.: The Collective Intelligence Platform, Online, http://www.baynote.com/technology/platform/ 2010 (1 page).

Hottolink Inc.; "Recognize" Online, http://www.hottolink.co.jp/english/reconize.html, 2009 (2 pages).

Andrejko et al.: User Characteristics Acquisition from Logs with Semantics, Slovak University of Technology in Bratislava, 2007 (8 pages).

Hongjun Lu et al: Extending a Web Browser with Client-Side Mining, Hong Kong University of Science and Technology Department of Computer Science, Clear Water Bay, Kowloon, Hong Kong, China, 2003 (12 pages).

Shankar et al.; ""Personalized Web Search Based on Client Side Ontology"", CS 498: B.Tech Project,10. IIT Kanpur, India 2010 (9 pages).

Sendhikumar et al.; "Personalized ontology for web search personalization" Anna University, Chennai, India , 2008 (7 pages).

Shahabi et al.; "Yoda an Accurate and Scalable Web based Recommendation System?" University of SouthernCalifornia, Los Angeles, Sep. 2001 (14 pages).

Why WUBAT? Website User Behavior &Analysis Tool, Wubat, Online, http://www.wubat.com/ (3 pages).

Claypool et al.; "Implicit Interest Indicators", Worcester Polytechnic Institute, Worcester, Computer Science Department Worcester Polytechnic Institute Worcester, MA 01609, USA., 2001 (8 pages).

Shahabi et al.; A Framework for Efficient and Anonymous Web Usage Mining Based on Client-Side Tracking, University of Southern California, Los Angeles, 2002 (48 pages).

Clattertrap; Online http://www.clattertrap.com; Jul. 20, 2010 (1 page).

HSNW: SRI defense technology spawns civilian application: published Jun. 29, 2010 (2 pages).

Anthony Ha: Facebook investor backs Chattertrap, a personal assistant for content, Jun. 28, 2010 (6 pages).

U.S. Appl. No. 11/411,467, Non-Final Rejection dated Jan. 27, 2009 (pp. 1-9 and attachments).

U.S. Appl. No. 11/411,467, Final Rejection dated Aug. 11, 2009 (pp. 1-11 and attachment).

U.S. Appl. No. 11/411,467, Examiner's Answer dated May 11, 2010 (pp. 1-11 and attachment).

Muthitacharoen Athicha, et al., "A Low-Bandwidth Network File System," Proceedings of the 18th ACM Symposium on Operating Systems Principles (SOSP '01), Oct. 2001.

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.

You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.

Eshghi et al., "Jumbo Store: Providing Efficient Incremental Upload and Versioning for a Utility Rendering Service," 2007 (16 pages).

U.S. Appl. No. 10/870,783, Non-Final Rejection dated Dec. 15, 2006, pp. 1-4 and attachments.

U.S. Appl. No. 10/870,783, Notice of Allowance dated Jun. 13, 2007 (7 pages).

Brin, Sergey, et al., "Copy Detection Mechanisms for Digital Documents", Department of Computer Science, Stanford University, Oct. 31, 1994, p. 1-12.

Manber, Udi, "Finding Similar Files in a Large File System," Department of Computer Science, University of Arizona, TR 93-33, Oct. 1993, (11 pages).

Rabin, M.O., "Fingerprinting by Random Polynomials," Technical Report, Center for Research in Computing Technology, Harvard University, 1981, Report TR-15-81 (14 pages).

U.S. Appl. No. 11/411,386, Non-Final Rejection dated Sep. 29, 2009, pp. 1-15 and attachment.

U.S. Appl. No. 11/411,386, Non-Final Rejection dated May 17, 2010, pp. 1-16 and attachment.

U.S. Appl. No. 11/411,386, Final Rejection dated Nov. 1, 2010, pp. 1-17.

U.S. Appl. No. 11/411,386, Non-Final Rejection dated Mar. 31, 2011, pp. 1-9 and attachment.

EMC: "Centera Content Addressed Storage Product Description Guide" Internet Citation, (Online) 2002 (20 pages).

U.S. Appl. No. 11/411,467, Examiner's Answer dated May 11, 2010 (13 pages).

U.S. Appl. No. 11/411,467, Patent Board Decision dated Jun. 11, 2013 (7 pages).

U.S. Appl. No. 11/411,386, Final Rejection dated Dec. 21, 2011, pp. 1-11.

U.S. Appl. No. 11/411,386, Final Rejection dated Sep. 15, 2011, pp. 1-10 and attachments.

U.S. Appl. No. 12/432,804, Final Rejection dated Aug. 9, 2011, pp. 1-20 and attachments.

U.S. Appl. No. 12/432,804, Non-Final Rejection dated Apr. 8, 2011, pp. 1-16 and attachments.

* cited by examiner

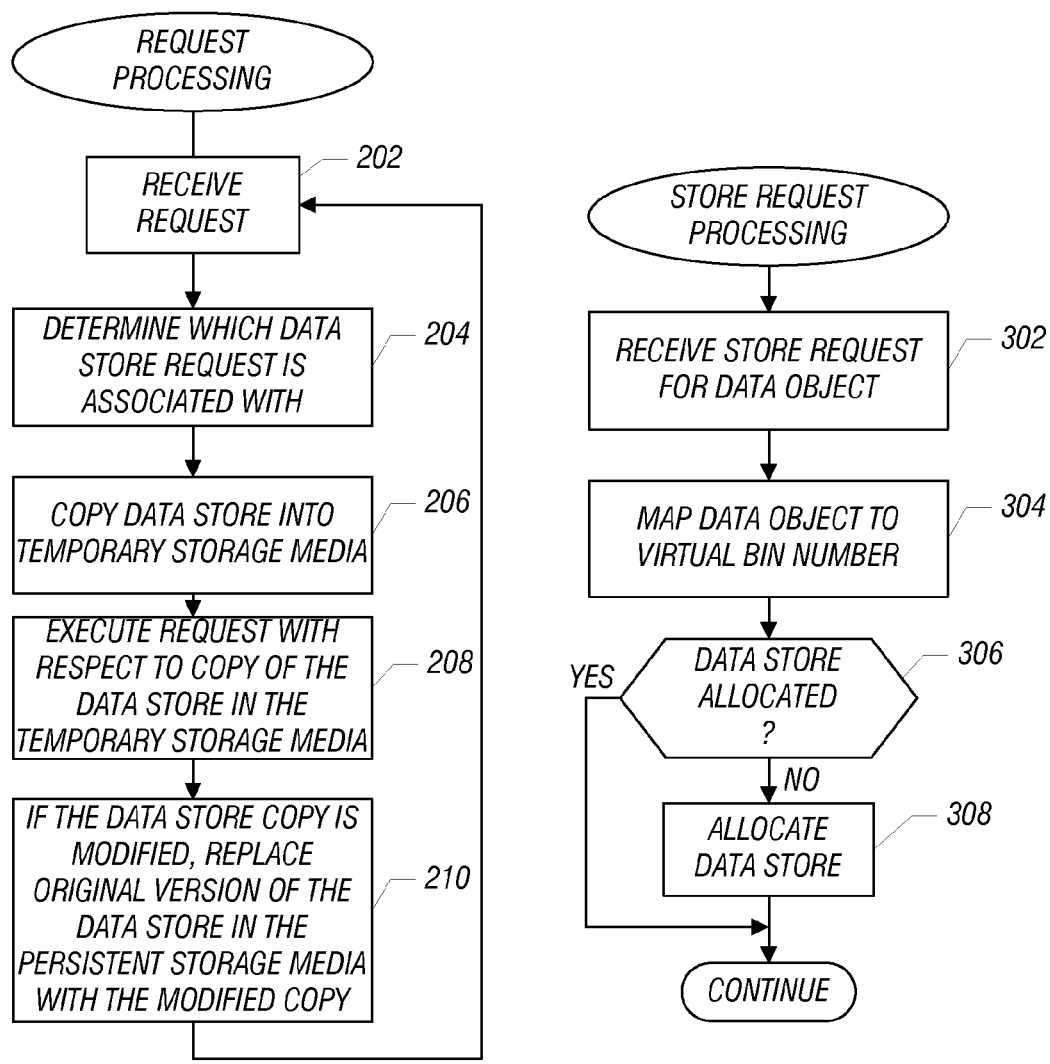
FIG. 2        FIG. 3

COPYING A DIFFERENTIAL DATA STORE INTO TEMPORARY STORAGE MEDIA IN RESPONSE TO A REQUEST

CROSS-REFERENCE TO RELATED APPLICATION

This is related to U.S. patent application Ser. No. 11/411,386, entitled "Distributed Differential Store With Non-Distributed Objects And Compression-Enhancing Data-Object Routing," filed Apr. 25, 2006, U.S. Patent Publication No. 2007/0250519, which is hereby incorporated by reference.

BACKGROUND

As capabilities of computer systems have increased, the amount of data that is generated and computationally managed in enterprises (companies, educational organizations, government agencies, and so forth) has rapidly increased. Data may be in the form of emails received by employees of the enterprises, where emails can often include relatively large attachments. Moreover, computer users routinely generate large numbers of files such as text documents, multimedia presentations, and other types of data objects that have to be stored and managed.

Data management performed by an enterprise includes data backup, where certain data in the enterprise is copied to backup storage systems to protect the integrity of the data in case of failures or faults. Another form of data management is data archiving, wherein some subset of data is moved to separate storage systems. However, storing large amounts of data is associated with various costs, including storage media costs, power and cooling costs, and management costs.

BRIEF DESCRIPTION OF THE DRAWINGS

Some embodiments of the invention are described with respect to the following figures:

FIG. 2 is a flow diagram of processing a request according to an embodiment; and FIG. 3 is a flow diagram of processing a store request according to another embodiment.

DETAILED DESCRIPTION

Figure 1:
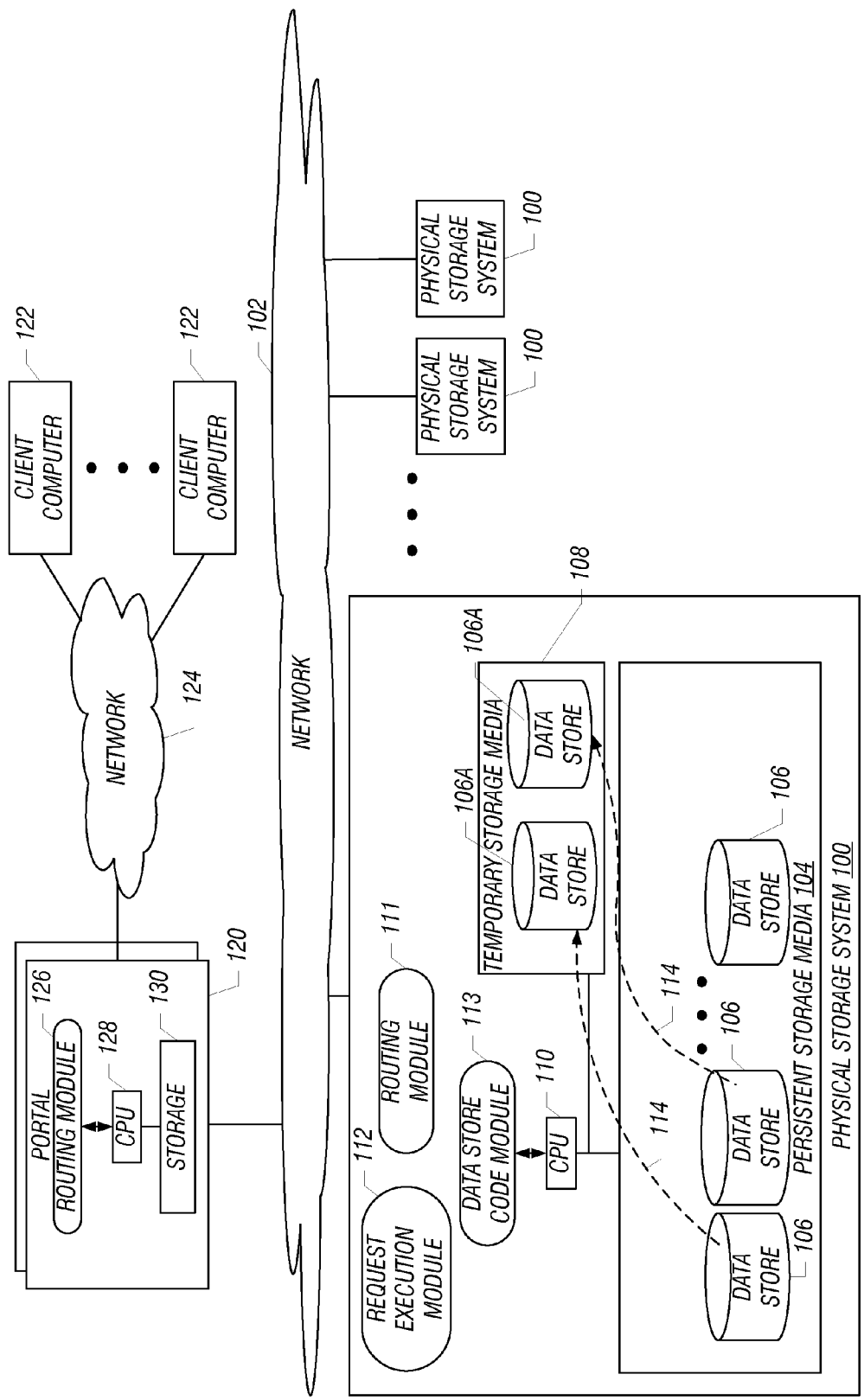
FIGS. 1 and 1A are block diagrams of exemplary network arrangements in which an embodiment of the invention can be incorporated.

Large amounts of data may be stored by an enterprise for various purposes, such as for data backup or data archiving. To enhance the efficiency of storing data, differential data stores can be used.

Traditional data stores are non-differential: the amount of space they use to store a set of objects does not depend on how different the objects are from each other. For example, the space used by a traditional store to store the set of objects $\{O_1, O_2, \ldots O_n\}$ is typically $M+f(O_1)+f(O_2)+ \ldots +f(O_n)$ for some constant M and function f. (If per-object compression is not used, $f(O_i)$ is the size of object i, possibly rounded up to a block boundary; otherwise, $f(O_i)$ is the size of the compressed version of $O_i$). Note in particular that the space used does not depend on how much object $O_i$ differs from another $O_j$.

Differential data stores, by contrast, are defined to be data stores that use less space the greater the similarity among the set of objects to be stored. They accomplish this, in general, by frequently storing only the differences between objects rather than a complete copy of each one. Consider, for example, the addition of a new multiple-megabyte object that differs only in its first few bytes from an object already in the store it is being added to. If the store is a differential store, then the addition should consume only a few hundred to a few thousand more bytes of space; on the other hand, if the store was non-differential, then the addition will consume megabytes. Note that merely storing only one copy of each object (e.g., storing an identical copy of an existing object consumes little or no additional space) does not by itself make a store differential: a differential store is a store that uses less space the more similar two or more different objects are to each other.

Building relatively large differential data stores can pose various challenges. One such challenge is that the large differential data stores are to be spread across multiple storage subsystems. Moreover, another challenge is that the amount of relatively high-speed memory (typically implemented with random access memory devices) can be relatively small when compared to the size of persistent storage media such as disk drives. If differential data stores are not designed properly, then efficiency can be lost if there exist excessive input/output (I/O) accesses of the relatively slow persistent storage media for performing various operations (e.g., read, write, etc.) with respect to data objects stored in the differential data stores.

In accordance with some embodiments, a system or technique is provided that selectively stores data objects in differential data stores, where selection of the differential data store to store a given data object is according to a criterion relating to compression of the data objects in each of the data stores. Each data object may be stored in one differential data store.

Each of the differential data stores is implemented as a subcomponent of a storage system. Any implementation can be used for the differential data stores, including possibly different implementations for different differential data stores. In some embodiments, it is assumed that that a given differential data store is made up of software code (referred to as "differential data store code") and data (referred to as "differential data store data"). The data of the differential data store may be further split into frequently-accessed data and infrequently-accessed data. Examples of infrequently-accessed data may include pieces of the data objects (e.g., chunks) that are stored in the differential data stores, while examples of the frequently-accessed data may include indexes that allow faster lookup of pieces of data objects, statistics about the pieces of the data objects, and other metadata. The frequently-accessed data of the differential data store is considered the temporary storage part of the differential data store, while the infrequently-accessed data of the differential data store is considered the persistent storage part of the differential data store.

The differential data stores' data is stored in a persistent storage, which can be implemented with disk-based storage media (magnetic or optical disk-based storage media), or other type of storage media.

A "data object" refers to any assembly of data, such as a file, a text document, an image, a video object, an audio object, any portion of any of the foregoing, or any other object. A "data store" refers to a logical collection of data (which can include multiple data objects) that can be stored in a physical storage system. In some embodiments, multiple data stores can be provided in one physical storage system. In an environment with multiple physical storage systems, each of the physical storage systems can include one or multiple data stores.

In accordance with some embodiments, the sizes of the differential data stores are made to be relatively small such that there are a relatively large number of differential data stores. The small size of the differential data stores allows the entirety of each differential data store (rather than just a portion of the differential data store) to be copied into temporary storage media such that data accesses (reads or writes) can be performed with respect to the copy of the differential data store in the temporary storage. Due to the relatively small size of the differential data stores, it does not cost much more in terms of storage access time to retrieve the entirety of the differential data store rather than just a portion of the differential data store. In some implementations, the size of each differential data store can be in the tens of megabytes (e.g., less than 100 megabytes, although other sizes can be used in other implementations).

Because it is relatively cheap to retrieve differential data stores into temporary storage media, batch processing does not have to be employed (where multiple requests are batched together such that the batch of requests are executed together with respect to a copy of a differential data store retrieved into the temporary storage media). Also, reordering of requests does not have to be performed.

With relatively small differential data stores, it is also possible to copy multiple differential data stores from persistent storage media to temporary storage media at once.

FIG. 1 illustrates an exemplary distributed differential data store system that includes multiple physical storage systems 100 that are connected to a network 102. The network 102 can be a local area network (LAN), storage area network (SAN), or other type of network. In a different implementation, techniques according to some embodiments can be performed with just one physical storage system 100, rather than plural physical storage systems.

FIG. 1 depicts components within one of the physical storage systems 100. The other physical storage systems 100 can include the same or similar components. Each physical storage system 100 includes persistent storage media 104, which refer to storage media that are able to maintain the data stored on such storage media even in the absence of main power in the physical storage system 100. Examples of the persistent storage media 104 include disk-based storage media such as magnetic disk-based storage media, optical disk-based storage media, flash memory, and so forth.

The physical storage system 100 also includes temporary storage media 108. The temporary storage media 108 is made of one or more storage devices that are designed to temporarily store data contained in the persistent storage media 104. Examples of the temporary storage 108 include dynamic random access memories (DRAMs), static random access memories (SRAMs), and so forth.

The physical storage system 100 also includes one or more central processing units (CPUs) 110 that is (are) connected to the persistent storage media 104 and the temporary storage media 108.

Multiple differential data stores 106 (each data store 106 represents a differential data store's data) can be stored in the persistent storage media 104 in each physical storage system 100. Note that the code portions of the data stores 106 are represented by the data store code module 113. In the ensuing discussion, reference to a "differential data store" or a "data store" is usually intended to refer to the data of the data store. Each data store 106 is configured to have a size that is small enough such that an entire data store 106 can be stored in the temporary storage media 108. In other words, the size of each data store 106 is configured to be less than the available space in the temporary storage media 108 that is allocated for storing a data store. In some embodiments, the sizes of the data stores 106 are made small enough such that multiple ones of the data stores can be copied to the temporary storage media 108 at the same time.

Various software modules are executable on the CPU(s) 110. The software modules include a request execution module 112 to control execution of requests received by the physical storage system. The request execution module 112 is also able to control the copying of data stores 106 between the persistent storage media 104 and the temporary storage media 108. As indicated by a dashed lines 114 in FIG. 1, two of the data stores 106 are currently copied into the temporary storage 108. The data stores copied into the temporary storage media 108 are represented as 106A.

Requests (e.g., write requests, read requests, delete requests, and/or other requests) that were received by the request execution module 112, causing the data stores 106A to be loaded into temporary storage 108, are executed with respect to one or more data store copies 106A in the temporary storage media 108.

It is noted that an incoming request can be for accessing a data store because that data store is where the data object referred to by the incoming request is stored or will be routed. The incoming request does not have to specify the specific data store. For example, a write request can include an update request (to modify an existing data object in a data store) or a store request (to insert a new data object into the system). The update request will (possibly indirectly) specify the data store to which the update request is to be routed, while the store request will not specify any data store, but instead will be routed to an appropriate data store by a routing algorithm.

The software modules in each physical storage system 100 further include a routing module 111 to route data objects to selected ones of the data stores.

Another software module in each physical storage system 100 is the data store code module 113, which contains the code for the differential data stores 106. The data store code module 113 may perform deduplication. Deduplication of data objects refers to avoiding repeated storage of common portions of data objects in the data stores. In some embodiments, the deduplication of data objects is accomplished based on partitioning data objects into non-overlapping chunks. A "chunk" refers to an element of a partition of input data, where the input data can be in the form of a file or other data object. As examples, the input data can be a document (such as a document produced or edited by a software application), an image file, a video file, an audio file, a tape image, or any other collection or sequence of data. By dividing one or more data objects into chunks, a system is able to identify chunks that are shared by more than one data object or occur multiple times in the same data object, such that these shared chunks are stored just once to avoid or reduce the likelihood of storing duplicate data. If chunking is used, then the differential data stores are considered chunk-based differential data stores.

One type of chunking algorithm is a landmark chunking algorithm, which performs partitioning of one or more data objects by first locating landmarks present in the one or more data objects. The landmarks are short predefined patterns of data whose locations are used in determining chunk boundaries. Landmarks are defined based on local content of the input data. For example, one technique of locating landmarks is to use a sliding window algorithm where, for each position within the input data, a fingerprint is computed for the sequence of data within the respective sliding window. The sliding window contains bytes within the input data that precedes the position of the input data being considered. If the computed fingerprint satisfies a particular criterion, the position is designated as a landmark. In one specific example, a position in the input file is a landmark if the immediately preceding 48 bytes (sliding window) have a Rabin fingerprint equal to −1 mod a predefined number related to the average desired chunk size. In other implementations, other fingerprints or other values computed from other functions can be computed based on the content of the input data. As yet another implementation, the landmarks can be predefined characters or other types of objects within the input data, such as a new line character, a paragraph break, a page break, and so forth.

As noted above, embodiments of the invention can be applied to an environment that includes just one physical storage system 100. In such an environment, the compression-enhancing routing algorithm is performed at just one level, within the physical storage system 100. However, in environments with multiple physical storage systems 100, as shown in FIG. 1, another level of routing is provided to route data objects and requests to selected ones of the physical storage systems 100. The second level of routing (which is also a compression-enhancing routing algorithm) can be performed in one or more portals 120, or alternatively, in the client computers 122. Note that requests for accessing data objects in the system are submitted by the client computers 122. Portals 120 receive the requests from the client computers 122 over a network 124, and such requests are then routed over the network 102 to respective physical storage systems 100. In some embodiments, network 124 and network 102 may be the same network.

If the second level of routing is performed at the portal(s) 120, then the compression-enhancing routing algorithm can be implemented by a routing module 126 in each of the portal(s) 120. The routing module 126 is executable by one or more CPUs 128 in each portal 120. The CPU(s) 128 is (are) connected to a storage 130 in the portal 120.

Although multiple portals 120 are shown, it is noted that in an alternative implementation, just one portal 120 can be provided. In some embodiments, the portal(s) 120 is (are) not separate machines but is (are) subset(s) of the physical storage systems 100.

If the compression-enhancing routing algorithm is implemented in the client computers 122, each client computer 122 can include a routing module to perform the routing of requests.

Figure 1A:
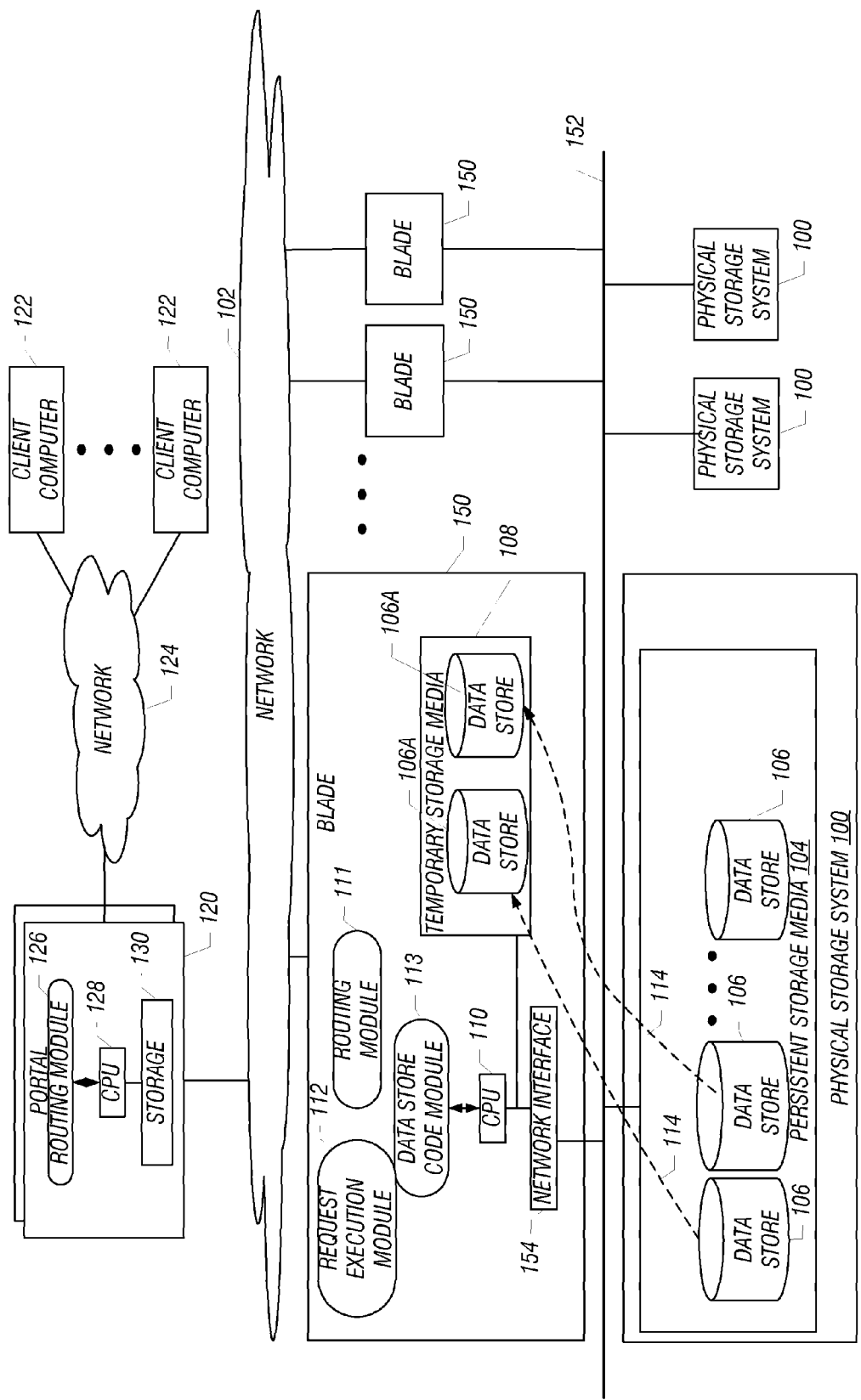

In an alternative embodiment, as shown in FIG. 1A, the storage arrangement can be provided to include a multi-blade system that has multiple blade servers 150 (containing the CPU(s) 110, software modules 111, 112, 113, and temporary storage media 108 described above). The blade servers 150 share access of the physical storage systems 100 that include corresponding persistent storage media 104 (which can be implemented with a large number of disk drives, for example). The blade servers 150 may be connected to the persistent storage media 104 over a storage fabric 152, such as a storage area network implemented with Fibre Channel. Each blade server 150 includes a network interface 154 to communicate over the storage fabric 152.

With the multi-blade implementation, scaling is relatively simple. The number of blade servers can be changed at any time. Which data stores and/or virtual bins (virtual bins are described further below) each blade is responsible for can be changed by a simple assignment of data store or bin ranges. Each blade server 150 is responsible for some data stores and/or virtual bins, and receives and processes all requests for those data stores/bins by copying the corresponding data stores to and from its temporary storage media. If a data store is reassigned from a first blade server to a second blade server, the first blade server pages it out (moves the data store from the first blade server's temporary storage media to the persistent storage media) if the first blade server had the data store copied into its temporary storage media, and the routing algorithm's data tables are adjusted so that future requests for that data store are routed to the second blade server instead of the first blade server. Data store reassignment can be used to increase or decrease the number of blade servers while maintaining good load balancing (even spread of how much work each blade server has to do).

In another variation, instead of using blade servers, a cluster of computers can be employed that uses a storage fabric to communicate with the persistent storage media.

In yet another variation, the blade servers or cluster of computers may not have shared access to the persistent storage media-in this variation, each data store will be accessible by just one blade server or computer.

FIG. 2 illustrates a procedure for processing a request in the physical storage system 100. When the request is received (at 202) by the physical storage system 100, the routing module 111 determines (at 204) which data store 106 the request is associated with. The received request can be a write request, a delete request, and/or a read request.

As noted above, if a received request is a write request, the write request can be either an update request or a store request. An update request will (indirectly) specify the data store that the update request is to be routed to, so the data store 106 that the update request is associated with can be determined based on the specification of the update request. Similarly, a delete request can also (indirectly) specify the data store that the delete request is associated with. On the other hand, a store request will not specify a data store, but instead the routing algorithm implemented by the routing module 111 will route the store request to one of the data stores according to where the compression-enhancing routing algorithm routes the accompanying object.

In one embodiment, the compression-enhancing routing algorithm used by the routing module 111 is a max-hash algorithm. With the max-hash algorithm, an incoming data object accompanying a store request is partitioned into multiple chunks, and hash values are computed for each of the chunks by applying a hashing function on the respective chunks. The max-hash routing algorithm chooses the hash with the maximum value (from among the multiple hashes computed for respective chunks of the data object) as the value to use for routing the data object to a particular one of multiple data stores. Thus, if two data objects share a chunk having a maximum hash value from among respective groups of chunks of the two data objects, then the two data objects are routed to the same data store. Further details regarding the max-hash routing algorithm are described in U.S. Patent Publication No. 2007/0250519.

In one embodiment, each data object accompanying a store request is assigned a name (c, k), where c is the name of the data store now storing the data object, and k is the name returned by that data store for the data object. The value of c (name of a particular data store) is chosen by the routing algorithm based on the maximum hash value of the given data object. The name (c, k) of the data object is also referred to as its retrieval identifier (ID). To retrieve an object with name (c, k), the requester retrieves the data object with name k in data store c.

Next, the data store 106 corresponding to the received request is copied (at 206) into the temporary storage media 108. In accordance with some embodiments, copying the selected data store 106 into the temporary storage media in response to the received request is performed without having to wait for other requests to arrive. In other words, the copying of the data store 106 to the temporary storage media 108 is not delayed after receiving the request so that more requests can be received. Since the data stores 106 are relatively small in size, batching of requests is not performed; instead, a received request can be individually executed with respect to a corresponding data store 106 copied to the temporary storage media 108 without first having to make an effort to batch the received request with another request.

After copying of the data store 106 into the temporary storage 108, the request is executed (at 208) with respect to the retrieved data store copy 106A. The request may be executed without having to perform any additional reading or writing of the data store 106 in persistent storage. That is, enough information is copied into the temporary storage 108 that no more information has to be read from the data store 106 in persistent storage in order to execute the request. If the request modified (e.g., updated a data object or deleted a data object) the data store copy 106A, then the original version of the data store 106 in the persistent storage media 104 is replaced (at 210) with the modified data store copy.

Note that if the received request is a read request, then the data store copy 106A would not be modified, so that the data store copy would not have to be written back to the persistent storage media 104.

The procedure of FIG. 2 is then repeated for further received requests. Note that the procedure of FIG. 2 can be performed in parallel within the storage system 100 for multiple received requests.

In fact, concurrency can be achieved both within a physical storage system 100 and across multiple physical storage systems 100. In a multi-blade environment where multiple blade servers share access to all persistent storage media 104, to ensure that multiple blade servers do not try to copy the same differential data store into temporary storage media of the multiple blade servers, locking or partitioning mechanisms can be used. Also, if a blade server attempts to write multiple data objects into a single differential data store, appropriate locking can be used to ensure data integrity.

In accordance with some embodiments, the compression-enhancing routing algorithm can provide for a very large space of destinations or virtual bins. A "virtual bin" refers to a logical entity whose content can be stored in a differential data store. Each virtual bin may have a differential data store allocated to store its data. For example, if the compression-enhancing routing algorithm employs the max-hash algorithm, as discussed above, the maximum hash of chunks in a data object to be stored returned by the compression-enhancing routing algorithm can be a relatively long value (e.g., a 20-byte value). Such a 20-byte value can map to a very large space of virtual bins. Each virtual bin is identified by a corresponding number.

There will likely be many more virtual bins than there will be room for differential data stores. In accordance with some embodiments, the allocation of a differential data store to a virtual bin occurs lazily; in other words, a differential data store is allocated to a virtual bin (which means that the differential data store is created on the persistent storage media) the first time an item to be stored is to be stored in the corresponding bin.

Thus, as shown in FIG. 3, in response to receiving (at 302) a store request for storing a data object, the data object is mapped (at 304) to a virtual bin number. If it is determined (at 306) that a differential data store corresponding to the virtual bin number has not yet been allocated, then a new differential data store is first allocated (at 308) by creating a differential data store.

Further processing can then continue, including performing the store operation and then copying the differential data store to the persistent storage media 104. The retrieval ID of the data item (which identifies the data store and the item) can then be returned to the requester or to the entity that relayed the request for future use.

In accordance with some embodiments, for improved efficiency, copies of the data stores 106A can remain cached in the temporary storage media 108, such that subsequent requests can be executed with respect to the cached data stores 106A so that the data stores do not have to be first retrieved from the persistent storage media 104. A cache management algorithm can be used to determine the replacement policy for cached data stores as the temporary storage media 108 becomes full. For example, a least recently used (LRU) algorithm can be used where the least recently used cached data store can be written out (if the cached data store has been modified) and then discarded to provide space for another data store. If bins are not partitioned across multiple physical storage systems 100 (in other words, each physical storage system is not allocated its respective and distinct set of bin numbers), then the cache management algorithm will have to ensure that when a data store is modified in one physical storage system 100, then any cached data store in another physical storage system 100 will have to be invalidated.

Certain unique chunks may occur frequently in different data objects. For example, the chunk that includes all zeros may be very common in a data set created by a system that uses extensive padding of data with zeros. Alternatively, it may be the case that a small set of chunks (e.g., 100 or less) may make up a relatively substantial amount (e.g., 5-10%) of the input data.

With the large frequency of occurrence of such chunks, data storage compaction may not be optimal since each frequent chunk may end up being duplicated a large number of times because each object (and thus each data store) may have several very frequent chunks.

To address the foregoing issue, a relatively small (e.g., 100) but statistically significant sample of differential data stores is collected at random. A list of the chunks contained in the sampled data stores is created. Chunks that occur in more than a threshold number (e.g., 3) of the sampled differential data stores are used to populate a list of very frequent chunks (referred to as the "very-frequent-chunk list"). This very-frequent-chunk list is written to the persistent storage media 104, while the hashes of these chunks are stored in the temporary storage media 108.

An alternative technique of creating the very-frequent-chunk list is to start with a maximum number of very frequent chunks and then populate the very-frequent-chunk list with the sampled bins' chunks in order of most frequently occurring until the number of spots in the very-frequent-chunk list is depleted. Chunks that occur in only one sampled bin may be omitted. Other techniques of creating or generating the very-frequent-chunk list can be used in other implementations.

In addition to maintaining the very-frequent-chunk list, a formerly-very-frequent-chunk list can also be maintained, which tracks chunks that were formerly identified as frequently occurring but are now no longer considered to be frequently occurring.

Each time a differential data store is copied into the temporary storage media 108 and before the data store is written back to the persistent storage media 104, chunks in such a data store that are on the very-frequent-chunk list are compressed by replacing such chunks with pointers to copies of those chunks located outside any data store, for example, in the very-frequent-chunk list. If the differential data store contains compressed versions of previously very frequent chunks (as identified by the former-very-frequent-chunk list), then the data store is uncompressed by replacing pointers of those chunks with the actual chunks. If the size of the formerly-very-frequent-chunk list is a concern, a housekeeping function can be performed to copy each data store into the temporary storage media occasionally—once each data store has been copied to the temporary storage media after time T, chunks that were very frequent before time T no longer have to be on the formerly-very-frequent-chunk list.

Instructions of software described above (including the request execution module 112, routing module 111, and deduplication module 113 of FIG. 1) are loaded for execution on a processor (such as one or more CPUs 110 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
    storing a plurality of differential data stores in persistent storage media;
    in response to receiving a first request to store a particular data object, selecting one of the differential data stores that are stored in the persistent storage media, wherein selecting the one differential data store is according to a criterion relating to compression of data objects in the differential data stores;
    copying the selected differential data store into temporary storage media, wherein the copying is not delayed after receiving the first request to await receipt of more requests;
    inserting the particular data object into the copy of the selected differential data store in the temporary storage media, wherein the inserting is performed without having to retrieve more data from the selected differential store in the persistent storage media; and
    replacing the selected differential data store in the persistent storage media with the copy of the selected differential data store in the temporary storage media that has been modified.

2. The method of claim 1, further comprising storing the differential data stores in multiple storage systems.

3. The method of claim 1, wherein copying the selected differential data store into the temporary storage media comprises copying both a temporary storage part and a persistent storage part of the selected differential data store into the temporary storage media.

4. The method of claim 3, wherein the persistent storage part contains data objects, and the temporary storage part contains metadata associated with the data objects.

5. The method of claim 1, wherein selecting the one differential data store according to the criterion relating to compression of data objects in the differential data stores comprises selecting the one differential data store using a compression-enhancing routing algorithm, and wherein the algorithm maps data objects to virtual bins.

6. The method of claim 5, further comprising:
    receiving a second request to store a second data object;
    mapping the second data object using the algorithm to a particular virtual bin of the virtual bins;
    determining whether a differential data store that corresponds to the particular virtual bin exists; and
    if the differential data store corresponding to the particular virtual bin does not exist, creating a new differential data store that will correspond to the particular virtual bin and storing the new differential data store on the persistent storage media.

7. The method of claim 1, further comprising returning an identifier of the particular data object and an identifier of the one differential data store to an entity that sent or relayed the request.

8. The method of claim 1, further comprising caching a number of differential data stores in the temporary storage, wherein the cached differential data stores are available for use to process subsequently received requests.

9. The method of claim 1, further comprising:
    receiving a retrieve request to retrieve a second data object;
    copying a second differential data store containing the second data object specified by the retrieve request into the temporary storage media; and
    performing the retrieve request with respect to the copied second differential data store.

10. The method of claim 1, further comprising:
    sampling a subset of the differential data stores;
    identifying chunks that occur in more than a threshold number of the sampled differential data stores; and
    creating a list of the identified chunks.

11. The method of claim 10, further comprising:
    after copying any given differential data store into the temporary storage media, determining whether the given differential data store has a chunk that is identified in the list;

replacing each chunk in the given differential data store that is identified in the list with a pointer to a copy of that chunk located outside of the given differential data store.

12. A system comprising:
temporary storage media;
a processor to:
- receive a request to store a particular data object;
- map the particular data object to a particular differential data store, wherein the mapping is according to a criterion relating to compression of data objects in a plurality of differential data stores;
- copy the particular differential data store from persistent storage media to the temporary storage media, wherein copying the particular differential data store is performed without having to wait for receipt of additional requests, and wherein the copy of the particular differential object includes both data objects of the particular differential data store and metadata of the particular differential data store;
- insert the particular data object into the copy of the particular differential data store in the temporary storage media; and
- write the copy of the particular differential data store that has been modified back to the persistent storage media to replace the particular differential data store in the persistent storage media.

13. The system of claim 12, wherein the processor is to further:
- receive a second request to store a second data object;
- discover that a differential data store corresponding to the second data object has not yet been allocated;
- in response to determining that the differential data store corresponding to the second data object has not yet been allocated, create the differential data store corresponding to the second data object.

14. The system of claim 12, comprising a computer within an environment of multiple computers that have shared access to the persistent storage media.

15. The system of claim 12, wherein the processor is configured to further:
- receive a second request to access data;
- map the second request to a second differential data store; and
- copy the second differential data store from the persistent storage media to the temporary storage media.

16. The system of claim 12, wherein the processor is configured to further:
cache, in the temporary storage media, copies of differential data stores; and
execute subsequently received requests with respect to the cached differential data stores.

17. An article comprising at least one computer-readable storage medium containing instructions that upon execution cause a processor in a system to:
- receive a request to store a data object;
- select a differential data store from among plural differential data stores to copy from persistent storage media to temporary storage media, wherein selecting the one differential data store is according to a criterion relating to compression of data objects in the differential data stores;
- copy the selected differential data store into the temporary storage media without first performing batching of the received request with one or more other requests and without performing reordering of the received request with respect to one or more other requests; and
- execute the request with respect to the copy of the selected differential data store.

18. The article of claim 17, wherein the instructions upon execution cause the processor in the system to further:
cache, in the temporary storage media, copies of a subset of the differential data stores; and
execute subsequently received requests associated with the cached differential data stores with respect to the copies of the cached differential data stores in the temporary storage media.

19. The article of claim 17, wherein the instructions upon execution cause the processor in the system to further:
sample a subset of the plural differential data stores;
populate a very-frequent-chunk list having a maximum number of entries with chunks from the sampled differential data stores in order of most frequently occurring until the entries in the very-frequent-chunk list are depleted.

20. The article of claim 19, wherein the instructions upon execution cause the processor in the system to further:
after copying any given differential data store into the temporary storage, determine whether the given differential data store has a chunk that is identified in the list;
replace each chunk in the given differential data store that is identified in the list with a pointer to a copy of that chunk located outside of the given differential data store.

* * * * *